United States Patent [19]

Madebach et al.

[11] 3,975,562

[45] Aug. 17, 1976

[54] TEXTILE FLOOR COVERING WITH BOTTOM OF THERMOPLASTIC FOAM AND A METHOD OF PRODUCING IT

[75] Inventors: Karl-Heinz Madebach, Leuna; Otto Wittenburg, Halle-Neustadt; Gerd Wilde, Halle-Neustadt; Werner Taube, Halle-Neustadt; Werner Lauterberg, Halle-Neustadt; Dieter Barthel, Leuna; Dieter Pape, Merseburg; Gerhard Gerstner, Berga; Joachim Antemann, Gera, all of Germany

[73] Assignee: VEB Leuna-Werke "Walter Ulbricht", Leuna, Germany

[22] Filed: Jan. 31, 1975

[21] Appl. No.: 545,951

[30] Foreign Application Priority Data

| Mar. 3, 1974 | Germany | 177179 |
| Feb. 8, 1974 | Germany | 176466 |
| May 3, 1974 | Germany | 178263 |

[52] U.S. Cl. .................. 428/95; 112/402; 112/410; 112/440; 428/96; 428/218; 428/310; 428/311; 428/315
[51] Int. Cl.² .............. D03D 27/00; D04H 11/00; D05C 17/00
[58] Field of Search ............ 428/95, 96, 310, 311, 428/315, 218; 112/402, 410, 440

[56] References Cited

UNITED STATES PATENTS

| 3,600,261 | 8/1971 | Kerres | 428/95 |
| 3,616,138 | 10/1971 | Wentworth | 428/96 |
| 3,695,987 | 10/1972 | Wisotzky | 428/95 |

*Primary Examiner*—Marion E. McCamish
*Attorney, Agent, or Firm*—Nolte and Nolte

[57] ABSTRACT

A textile floor covering consisting of a textile layer, to the carrier layer of which the pile has been applied, and a bottom of thermoplastic foam, wherein the textile layer is directly connected with a thermoplastic foamed sheeting of polymerizates as a bottom, the polymerizates being selected from a group consisting of ethylene polymerizate, ethylene vinylacetate copolymerizate, and a mixture of ethylene polymerizate and ethylene vinylacetate copolymerizate, the foamed sheeting having a thickness of between 1.5 and 10 mm and a density of 0.10 to 0.40 g/cm³, preferably from 0.15 to 0.20 g/cm³.

A method for producing a textile floor covering consisting of a textile layer, to the carrier layer of which the pile has been applied, and a bottom of thermoplastic foam, wherein the textile layer is applied directly to a foamed sheeting of polymerizates, as defined above, by means of thermolaminating, welding, sewing or stitch-bonding.

14 Claims, No Drawings

TEXTILE FLOOR COVERING WITH BOTTOM OF THERMOPLASTIC FOAM AND A METHOD OF PRODUCING IT

THE INVENTION AND ITS BACKGROUND

The invention is concerned with a textile floor covering consisting of a textile layer, to the carrier layer of which the surface material (pile) is applied, a bottom of thermoplastic foam and, if necessary, of additional layers, and a process for its manufacture. It is known to provide textile floor coverings on their bottom side with thermoplastic layers.

Thus it is known to apply dispersions or solutions of thermoplastics to the bottom side of textile layers and to remove the solvents or dispersing agents afterwards. Doing so a foaming, if required, can be performed in one operation. The bottom side of these carpets or floor coverings is then provided with a flexible covering which can, if necessary, be foamed. The plastic foam can be provided with an embossing to render it nonskid. Furthermore it is known to glue thermoplastic sheetings on the bottom side of textile floor coverings. However, with this technology unsatisfactory results were achieved due to the bad binding property of thermoplastics. Finally it is known to provide the bottom side of the textile covering with a plastisol, to melt the applied plastisol compound and to combine it with a thermoplastic sheeting, which can be a foamed sheeting. In order to prevent a destruction of the foam structure, the foamed sheeting is applied in cold state. The heat contained in the plastisol melt must be adequate for joining the layers. This process has the disadvantages that in each case several operations are required, that the removal of the dispersing agent or the solvent necessitates higher technological expenses and that according to these processes only such thermoplastics can be used as do not possess optimum mechanical properties or a high permanent weight, such as polyvinyl chloride.

Subject of the invention is a textile floor covering having a high step elasticity, a high restoring property, a high mechanical strength as well as dust and water impermeability and which can be manufactured by means of a simple technology saving the otherwise usual operations.

This problem is solved by means of a textile floor covering consisting of a textile layer, to the carrier layer of which the pile has been applied, a bottom of thermoplastic foam and, if necessary, additional layers, in which according to the invention the textile layer is directly combined with a foamed sheeting of polymerizates of the ethylene as a bottom.

The bottom can consist of a foamed sheeting of homopolymerizates of the ethylene or of copolymerizates of the ethylene, preferably of ethylene-vinylacetate copolymerizate. Foamed sheetings of mixtures of ethylene homopolymerizates and ethylene copolymerizates, preferably ethylene-vinylacetate copolymers, can also very well be used.

The foamed sheeting has a thickness of 1.5 to 10 mm and a density of 0.10 to 0.40 g/cm$^3$, preferably 0.15 to 0.20 g/cm$^3$. It has an open or preferably closed foam structure at the surface and a closed or mixed cells foam structure inside. The connection of the carrier layer with the pile can be achieved by sewing, knitting, stitch-bonding or needling. The pile consists preferably of polyamide, polyacrylonitrile, rayon silk, polyester, polyolefin fibres, wool or animal hair. The carrier layer can consist of natural or synthetic fibres or of glass fibres.

The textile floor covering according to the invention can consist of carpets in fixed sizes, carpet lengths or carpet tiles.

The textile layer can be directly connected with the foamed sheeting of polymerizates as a bottom by means of a cooled melt of a polymerizate. The cooled melt should consist of the same polymerizate as the foamed sheeting. Preferably this cooled melt consists of ethylene-vinyl-acetate copolymerizates.

The textile floor coverings according to the invention are manufactured in such a way that a textile layer is directly applied to a foamed sheeting of ethylene homo and/or copolymerizate as a bottom by means of thermo-laminating, welding, sewing or stitchbonding.

The thermolaminating should be performed by melting the surface of the foamed sheeting and pressing-on of the upper layer, doing so the pressing-on can both be done continuously by means of a roller system and discontinuously by means of a press. The textile surface layer should preferably be preheated.

The welding of the thermoplastic foamed sheeting on the textile layer can be performed by spot welding or by linear welding. In case that several lengths of foamed sheetings have to be applied as a bottom to a wider textile layer, the lengths of foamed sheetings should preferably be connected by means of welding, sewing or a hot sealing band.

In applying the foamed sheeting it is possible to connect simultaneously or afterwards additional sheetings, e.g. metal sheetings, non-foamed plastic sheetings, should this be necessary for special fields of application. In order to preserve the foam structure the bottom side should be cooled while the surface of the foamed material is melted.

It is also possible to connect a textile surface layer, which has not been pretreated with a plastic dispersion, with the bottom of thermoplastic foam by means of a non-porous elastic thermoplastic layer, into which the carrier layer has been incorporated, the bottom of thermoplastic foam having a density drop.

The density drop in the bottom of thermoplastic foam is in the range of 0.1 to 0.4 g/cm$^3$ at the bottom side and up to 0.5 to 0.9 g/cm$^3$ at the densified upper side, which forms a non-porous elastic layer, a so-called rind. The thickness of this layer is 10 to 50 percent of the total thickness of the bottom.

This textile floor covering is manufactured in such a way that a surface layer of the sheeting of thermoplastic foam, having a thickness of 0.3 to 3 mm, is melted and the textile layer, having not been pretreated with a plastic dispersion, is pressed on the thermoplastic melt with a pressure of 5 to 30 ats. In order to preserve the foam structure the bottom side should be cooled while melting the surface of the foamed material.

The essential merit of this process is the fact that the textile layer need not be pretreated or densified by naps by means of a plastic dispersion. Due to the incorporation of the carrier layer of the textile material into the thermoplastic according to the invention a high strength of the textile layer is achieved without any previous finish.

The density-drop in the bottom of thermoplastic foam and the non-porous elastic thermoplastic layer at the bonding line between the textile and plastic materials resulting therefrom, produces an excellent step elasticity, a high mechanical strength of the covering, a good restoring property as well as dust and water impermeability. This process is characterized by its easy practicability as well as by the small number of technological process steps.

The manufacture of the textile floor covering can also be performed in such a way that a melt of a polymerizate or copolymerizate of ethylene is applied to the surface of the foamed sheeting and that this sheeting is combined with the bottom side of the textile layer. Doing so the textile layer should be preheated. The same can also be done with the surface of the foamed sheeting. The two layers can be combined by means of rolls or presses.

Using this process there is the advantage that the thickness of the foamed sheeting will not be affected by melting and that, nevertheless, there will be a good and direct bond between the two layers due to the identity or affinity of the chemical structure of the two plastic materials.

All waste matter of the ethylene polymerizate, especially the waste matter from the manufacture of the foamed sheeting proper, which can also contain mechanical contaminations, can be used as a melting component. This fact results in a special economic advantage. Furthermore, non-identical ethylene-vinylacetate copolymerizates with the most different melt indices can be used.

Using this invention the following merits will result: The production speed in applying the bottom of plastic foam will increase upto 5 to 18 m/min, preferably 10 to 15 m/min, compared with 3 m/min with the application and foaming of caoutchouc-latex mixtures. The energy consumption, being considerably high for the removal of the water from the latex, will also be reduced.

The thermolining of the bottom can be done on technically simple machines, and several operations can be saved in the carpet industry. At the same time the chemical-specific procedure is removed from this line of industry, the control of which is in many cases insufficient. By the separate manufacture of the foamed sheeting the foam properties can be specifically influenced, which improves the properties of the finished product.

Using the foamed sheetings of ethylene-polymerizate a new raw material for the carpet industry is developed having better properties than the foams used hitherto. Due to the cellular structure there is practically no water absorption. Polyethylene foam ages much less than PVC foam or caoutchouc-latex foam. It possesses good strengths and a better pressure elastic behavior.

Using 100 percent synthetic carpet bottoms the product according to the invention is resistant to rotting and can, therefore, be used in the open air, in moist rooms and in motor vehicles. In addition it is thermoworkable. Therefore, it is possible to manufacture formed floor coverings to be used in vehicles, cabins and other rooms with uneven floors.

EXAMPLE 1

For the manufacture of a Malimo (trademark) carpet with weft pile arrangement according to the known Malimo process by means of polyamide yarn textured 130 tex by 2 with a sewing thread of polyamide cord type 94 tex and viscose yarn 3.3 tex (jute type) a crude material for floor coverings having a width of 80 cm is made on a sewing-knitting machine with weft pile arrangement.

According to a known foaming process for thermoplastics a foamed sheeting, 80 percent of which consists of low-density polyethylene and 20 percent of ethylene-vinyl-acetate copolymerizate with a vinylacetate content of 6 percent, is made. This foamed sheeting, having a closed surface, possesses a mixed cells, however, mostly closed fine-porous structure. Its density is 0.18 g/cm$^3$, its thickness is 3.0 mm and its width is 80 cm.

In order to perform the thermolaminating process required the above mentioned Malimo carpet, which is unrolled from a roll, is heated at the bottom side. Doing so it is heated up to a temperature of 70°C in a heating tunnel.

Synchronously with the carpet the above mentioned foamed sheeting is also unrolled from a roll, and at the upper side it is shock-like heated up to 230°C. Doing so the surface is melted so that a thin layer of thermoplastic melt is formed, the foam structure below the molten layer being largely preserved, since during the heating process the bottom side of the foamed sheeting is cooled from above.

The preheated crude material for the floor covering is combined with the molten foamed sheeting in such a way that immediately after the melting of the foamed sheeting the back of the carpet is pressed under a pressure of 8 ats through the gap of a roller system. The working speed is 11.0 m/min. In this process the thickness of the foamed sheeting is reduced to 2.5 mm.

The textile floor covering with a bottom of thermoplastic foam obtained is cooled in the air, doing so it is set and subsequently wound up. By trimming the edges a sheeting width of 75 cm is obtained.

The carpet floor covering according to this example has a solid bond between the crude material of the floor covering and the foamed sheeting, good silencing and insulating properties as well as a good ageing behaviour, i.e. after 10 days ageing in an air stove at 80°C there were no changes.

EXAMPLE 2

Polyamide yarn textured 130 tex by 2 is processed with a woven jute bottom having a weight of 340 g/m$^2$ and a width of 1.60 m into tufted carpet crude material. A foamed sheeting with closed surface and mixed cells, however, mainly closed foam structure is made from ethylene-vinylacetate copolymerizate with a vinylacetate content of 12 percent. The foamed sheeting has a thickness of 2.3 mm, a density of 0.15 g/cm$^3$ and a width of 80 cm.

According to example 1 the tufting carpet crude material is heated to 80°C and the foamed sheeting to 220°C. During the melting process at the surface of two 80 cm lengths of foamed sheetings, which are handled directly side by side, both lengths are thermally welded at the bottom side in longitudinal direction, so that after the pair of rollers has been passed a closed carpet length will be obtained, which will be cooled and wound up according to example 1. By means of edge trimming a width of 150 cm will be obtained. The textile floor covering with a bottom of thermoplastic foam has a very good flexibility and a good ageing behaviour. The adhesive bond between the tufting crude material and the foamed sheeting is very good due to the use of ethylene-vinylacetate copolymerizate.

EXAMPLE 3

According to example 1 a crude material for Malimo floor covering having a width of 1.60 m is made. From low-density polyethylene a foamed sheeting possessing a width of 80 cm with closed surface and mixed cells, mainly closed, fine-cell foam structure, having a thickness of 8 mm and a density of 0.25 g/cm$^3$, is made. By means of separating or splitting on a splitting unit this foamed sheeting is changed into four foamed sheetings, which possess an interconnecting surface at one or both sides and have a thickness of 2 mm.

In the manufacture of the Malimo crude material the textile constituents are sewn in one operation with the split foamed sheetings, which are fed side by side, so that a firm bond between the materials and thereby a carpet floor covering with thermoplastic foam bottom is obtained.

EXAMPLE 4

In the manufacture of a tufted carpet with a carrier layer of spinning fleece, made from core-cover textile fibres of polyester (core) and polyamide (cover), with a weight of about 130 g/m$^2$ and a width of 160 cm, a known process is used.

According to example 1 a foamed sheeting is made from a mixture of 20 percent of ethylene-vinylacetate copolymerizate and a vinylacetate content of 6 percent and 80 percent of low-density polyethylene, which has a width of 80 cm and a thickness of 3 mm. The crude material for the floor covering is heated according to example 1. Two lengths of foamed sheetings are heated at the upper side up to 220°C according to example 1. The bottom side of the sheeting lengths is maintained at a temperature of 25°C by means of a cooling system. Prior to the heating process both lengths are sewn with each other. In accordance with example 1 the laminating process is performed at a working speed of 15 m/min. The same applies to the subsequent treatment.

The textile floor covering obtained is characterized by a good bond strength between the two sheetings, a good restoring property and a good ageing behavior.

EXAMPLE 5

In the manufacture of carpet tiles a needle felt crude material, treated with thermoplastic dispersions according to known processes, which has a size of 1.0 by 1.2 m, is pressed on top of a sheet of foamed sheeting from low-density polyethylene having a thickness of 2.5 mm and a density of 0.20 g/cm$^3$ in a hydraulic or another process under a pressure of 8.0 kgf/cm$^2$. Doing so the sheet of foamed sheeting is heated at the surface up to 240°C by means of a heating device and then immediately fed into the press. Thereby the molten surface is connected with the carpet material. After the bonding the pieces are further treated according to example 1.

The cooled pieces are fed into a tile puncher, where in accordance with the desired edge lengths or shapes they are processed into tiles.

EXAMPLE 6

A foamed sheeting according to example 1 is wound off a roll and at the upper side coated via a roller system with about 30 g/m$^2$ of a melt from waste matter of the bottom used, having a temperature of 230°C.

A preheated crude material of the floor covering according to example 1 is connected with the melt of the coated foamed sheeting in such a way that the back of the carpet is fed synchronously with the sheeting through the gap of a roller system. The coated side of the sheeting is pressed to the back of the carpet. The working speed is 60 m/min.

The textile floor covering with thermoplastic foam bottom obtained is cooled in the air, thereby it is set and then wound up. The carpet floor covering according to this example has a firm bond between the crude material of the floor covering and the foamed sheeting.

EXAMPLE 7

According to one of the known foaming processes for thermoplastics a foamed sheeting, consisting of low-density polyethylene, is made. This foamed sheeting, having a closed surface, is characterized by mixed cells, however mainly closed fine-porous structure. Its density is 0.18 g/cm$^3$, its thickness is 3.0 mm and its width is 80 cm.

According to example 1 this foamed sheeting is synchronously with a carpet body wound off a roll and via a roller system coated at the upper side with about 15 g/m$^2$ of a melt of an ethylene-vinylacetate copolymer having a temperature of about 100°C.

The preheated crude material of the floor covering is connected with the foamed sheeting, being coated with the melt, in such a way that the back of the carpet is directly fed through the gap of a roller system. The working speed is 60 m/min.

The obtained textile floor covering with a bottom of thermoplastic foam is cooled in the air, thereby it is set and then wound up. The carpet floor covering obtained according to this example has a firm bond between the crude material of the floor covering and the foamed sheeting.

EXAMPLE 8

In the manufacture of a Malimo carpet with weft pile arrangement according to the known Malimo process by means of polyamide yarn 130 tex by 2 with a sewing thread of polyamide yarn-cord type 94 tex and viscose yarn 3.3 tex (jute type) a crude material for coverings having a width of 160 cm is made on a sewing-knitting machine with weft pile arrangement.

According to one of the known foaming processes for thermoplastics a foamed sheeting is made, 90 percent of which consists of low-density polyethylene and 10 percent of ethylene-vinylacetate copolymerizate with a vinylacetate content of 15 percent. This foamed sheeting has mixed cells, fine-porous structure. Its density is 0.15 g/cm$^3$, its thickness is 3.0 mm, its width is 80 cm.

The foamed sheeting is melted in a layer of 0.8 mm so that in this layer the foam structure will be practically removed.

The textile layer, having been preheated to 80°C, is pressed under a pressure of 25 atmospheres on the molten side of the foamed sheeting so that a closed so-called rind of about 0.3 mm is formed and the density of the sheeting will increase from 0.15 g/cm$^3$ at the bottom side of the bottom to 0.8 g/cm$^3$ in the rind. This process is carried out continuously.

During the melting process at the upper side of two lengths of foamed sheetings having a width of 80 cm and being handled directly side by side, both lengths are welded with each other at the bottom side in longitudinal direction, so that a closed length is formed. The textile floor covering obtained in this way has an excellent strength, although the textile layer did not possess a densified or impregnated carrier layer. The bond between the sheetings is so intimate that in a test to separate them only the plastic sheeting or the textile sheeting will be destroyed without loosening the bond.

What is claimed is:

1. A textile floor covering consisting of a textile layer constituted of a pile and a textile carrier layer for the pile and foamed thermoplastic sheeting directly connected to and in contact with the textile layer, the thermoplastic being selected from the group consisting of polyethylene, copolymers of ethylene and vinyl acetate and mixtures of polyethylene and copolymers of ethylene and vinyl acetate, the foamed thermoplastic sheeting having a thickness of from 1.5 to 10 mm. and a density of from 0.10 to 0.40g./cm.$^3$.

2. A textile floor covering according to claim 1, wherein the foamed sheeting has a closed foam structure at the surface as well as inside.

3. A textile floor covering according to claim 1, wherein the foamed sheeting has an open foam structure at the surface and a closed foam structure inside.

4. A textile floor covering according to claim 1, wherein the foamed sheeting has a closed foam structure at the surface and a mixed-cells foam structure inside.

5. A textile floor covering according to claim 1, wherein the foamed sheeting has an open foam structure at the surface and a mixed-cells structure inside.

6. A textile floor sovering according to claim 1, wherein the pile consists of a material selected from the group consisting of polyamide, polyacrylonitrile, rayon, polyester and polyolefin fibers, wool, and animal hair.

7. A textile floor covering according to claim 1, wherein the carrier layer consists of a material selected from the group consisting of natural fibers, synthetic fibers, and glass fibers.

8. A textile floor covering according to claim 1, wherein the textile layer is directly connected with the foamed sheeting by a cooled melt of a material selected from a group consisting of polyethylene, ethylene vinyl acetate copolymers, and mixtures thereof.

9. A textile floor covering according to claim 1, in which the density of the sheeting is from 0.15 to 0.20 g./cm.$^3$.

10. A textile floor covering according to claim 1, in which the textile layer and the foamed sheeting are connected by knit stitches.

11. A textile floor covering according to claim 1, in which the textile layer and the foamed sheeting are connected by stitch-bonding stitches.

12. A textile floor covering according to claim 1, in which the textile layer and the foamed sheeting are connected by neelde-felting bonds.

13. A textile floor covering wherein further the textile layer is connected to the foamed sheeting by a non-porous elastic layer consisting of the same thermoplastic as the sheeting, into which the carrier layer has been incorporated, and the bottom side of the foamed sheeting is of a density of from 0.1 to 0.4 g/cm$^3$ and the upper side of the foamed sheeting is of a density from 0.5 to 0.9 g/cm$^3$.

14. A textile floor covering according to claim 13, wherein the the thickness of the non-porous elastic layer ranges between 10 and 50 percent of the total thickness of the thermoplastics.

* * * * *